(No Model.) F. A. HETHERINGTON. 2 Sheets—Sheet 1.
PLANT FOR MIXING MATERIALS FOR PLASTIC PAVEMENTS.
No. 540,912. Patented June 11, 1895.
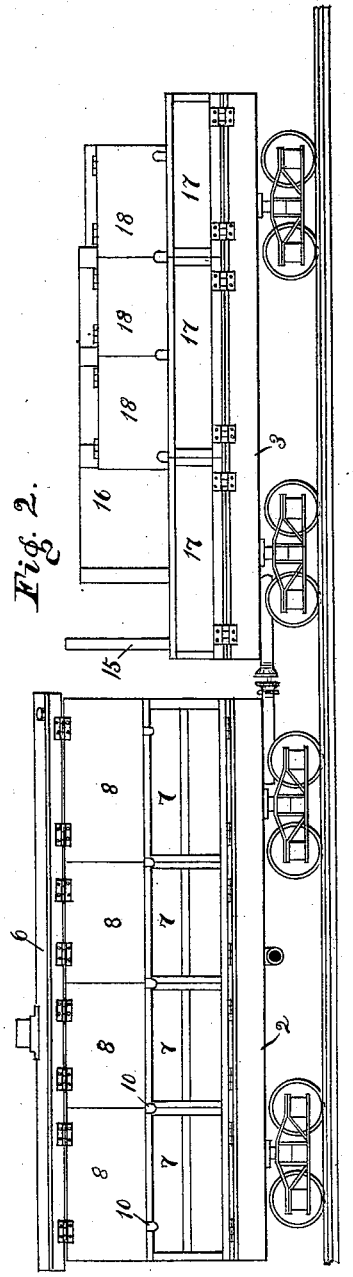
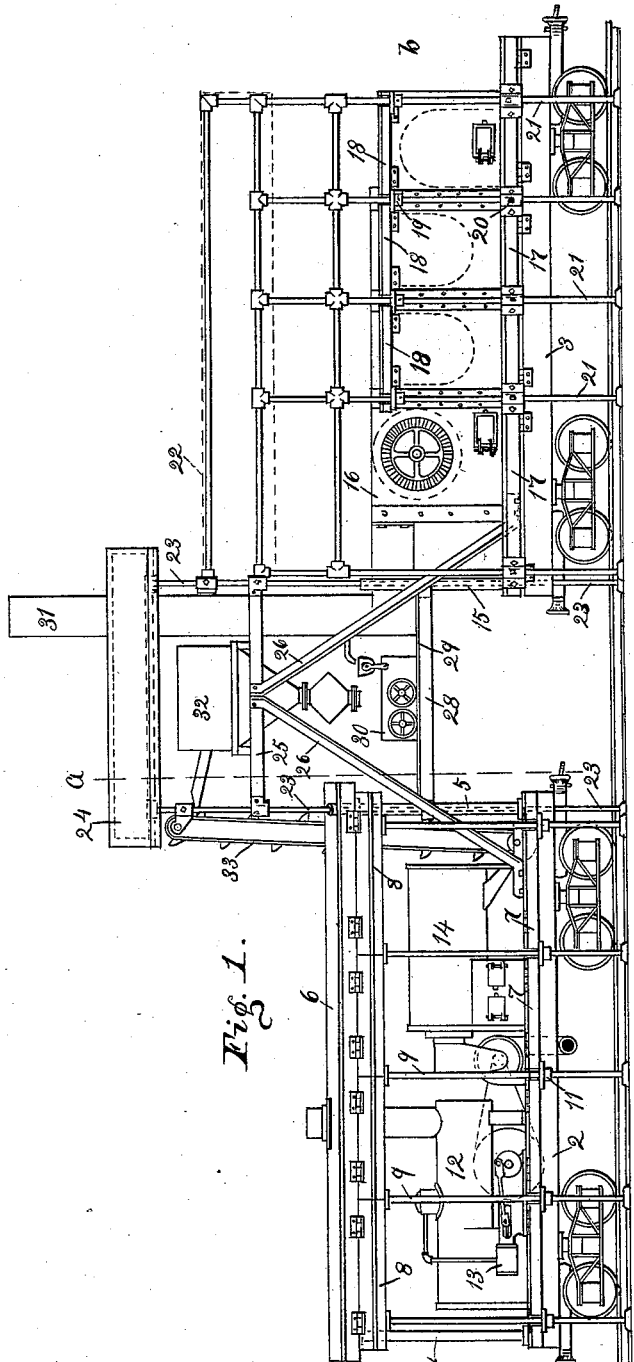
Witnesses
V. M. Hood.
H. P. Hood.
Inventor
Frederick A. Hetherington (No Model.) 2 Sheets—Sheet 2.

F. A. HETHERINGTON.
PLANT FOR MIXING MATERIALS FOR PLASTIC PAVEMENTS.

No. 540,912. Patented June 11, 1895.

Witnesses
V. M. Hood.
H. P. Hood.

Inventor
Frederick A. Hetherington

UNITED STATES PATENT OFFICE.

FREDERICK A. HETHERINGTON, OF INDIANAPOLIS, INDIANA.

PLANT FOR MIXING MATERIALS FOR PLASTIC PAVEMENTS.

SPECIFICATION forming part of Letters Patent No. 540,912, dated June 11, 1895.

Application filed March 8, 1895. Serial No. 540,971. (No model.)

*To all whom it may concern:*

Be it known that I, FREDERICK A. HETHERINGTON, a citizen of the United States, residing at Indianapolis, in the county of Marion and State of Indiana, have invented a new and useful Improvement in Portable Plants for Mixing Materials for Plastic Pavements, of which the following is a specification.

My invention relates to an improved portable plant for manufacturing material for asphalt and other like plastic pavements.

Heretofore asphalt and other like plastic pavements have been laid in large cities only. This is believed to be due largely to the expensive nature of a suitable plant for manufacturing the plastic material.

The object of my improvement is to provide a suitable plant for this purpose which may be readily moved from place to place, its several parts being adapted to each other so as to be quickly packed away in portable shape for transportation, and to be quickly and easily set up to form a continuous structure within which the several ingredients forming the plastic material for pavements may be properly treated, mixed together, and delivered for distribution.

It is believed that the particular apparatus which I employ for treating the several ingredients which form the plastic compound, and for mixing them together, presents features of patentable novelty, but they will form the subject matter of separate applications, and will be simply indicated here in outline; this application being confined to the structure for housing and transporting the apparatus.

The accompanying drawings illustrate my invention.

Figure 3:
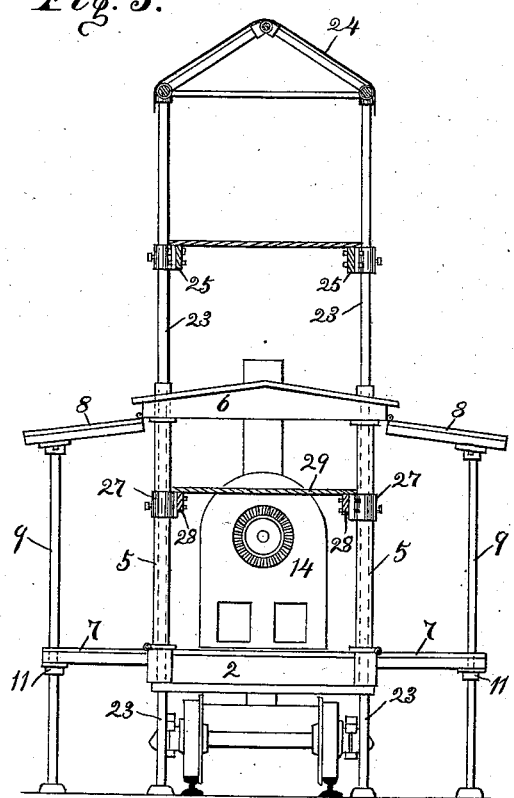
Figure 4:
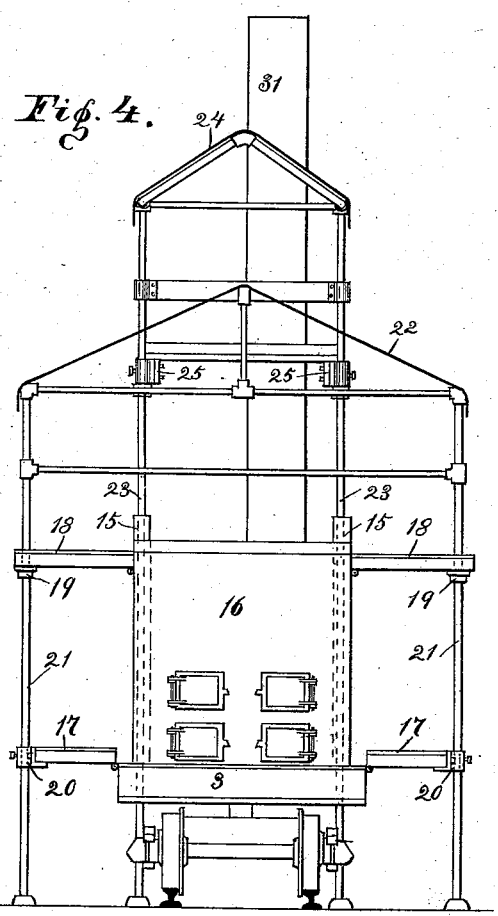

Figure 1 represents a side elevation showing the plant in position for operation. Fig. 2 represents a side elevation showing the plant in shape for transportation. Fig. 3 represents, on a larger scale, an end elevation as seen from the line *a*, Fig. 1. Fig. 4 represents an end elevation, also on a larger scale, at *b*, Fig. 1.

In the drawings, 2, and 3, indicate a pair of platforms, mounted upon trucks, preferably railway-car trucks, so that the platforms and all that they carry may be readily transported from place to place. Erected upon platform 2, at its opposite ends, are pairs of columns, 4, and 5, which support the roof, 6. The columns 5, 5, at one end of the platform, are hollow throughout their length, for the purpose hereinafter explained. Hinged to opposite edges of platform 2, are a series of light platforms, 7, which are so arranged that they may be turned down horizontally so as to form side extensions of the main platform, as shown in Figs. 1 and 3, or may be turned up vertically against the posts 4 and 5, so as to partly inclose the space between the roof and platform, as shown in Fig. 2. Hinged to opposite edges of the roof structure 6, are a series of doors, 8, arranged to fold down vertically against the posts 4, and 5, so as to complete the inclosure on the sides of the space between the roof and the platform, as shown in Fig. 2, or to be extended as shown in Figs. 1 and 3, to form continuations of the roof.

Platforms 7, and doors 8, are supported when extended, by means of a series of detachable independent posts, 9, the platforms being notched at the outer edge, as at 10, Fig. 2, so as to partially embrace the post, and resting upon flanged collars, 11, secured to the posts; the tops of the posts being secured to the under side of the doors 8.

Mounted upon platform 2 is a power-plant consisting of a steam-boiler, 12, steam-engine, 13, and a sand-drying apparatus, 14. Erected upon one end of platform 3, are a pair of hollow columns, 15. The principal portion of the rest of the platform is occupied by a rectangular casing, 16 made preferably of iron plates, and containing the apparatus for melting and mixing the asphaltum and oils, or other like ingredients which form the liquid portion of a plastic material for pavements.

Hinged to the edges of platform 3, are a series of light platforms, 17, which are adapted to be folded up against the sides of casing 16, as shown in Fig. 2, or extended horizontally as shown in Figs. 1 and 4. Hinged to the sides of casing 16, near its upper edge, are a series of light platforms, 18, which are adapted to fold down against the sides of the casing, as shown in Fig. 2, or to be extended horizontally as shown in Figs. 1 and 4.

The free edges of platforms 17 and 18 are supported, when extended horizontally, upon collars, 19, and 20, which are secured to the uprights, 21, of a light frame-work, constructed of tubes or rods and suitable couplings, erected about and above platform 3; said frame-work resting upon the ground at each side of the platform, and forming a support for a canvas roofing, 22.

In establishing the plant for operation, the platforms 2 and 3 are connected, and held at a fixed distance apart, by means of an intermediate temporary structure, formed preferably of light tubing, and having its corner posts, 23, passing telescopically through the columns 5, of platform 2, and the columns 15 of platform 3, said posts extending below the respective platforms and resting upon the ground, so that the weight of said intermediate structure is supported independently of the platforms. Posts 23 extend also above the structures formed on platforms 2 and 3, to support a light canvas roof, 24, and girders 25, which are connected by braces, 26, with the platforms 2 and 3. Columns 5 and 15 are each provided with clips, 27, to which are secured a pair of girders, 28, upon which a flooring, 29 rests. Girders 28 are arranged at such a height above the ground as to leave an open drive-way between the platforms 2 and 3, for the purpose of allowing the carts for the distribution of the paving material to be driven beneath the girders and flooring supported thereby, so that the plastic material when mixed may be delivered directly from the mixing tank, 30 to the carts. Flooring 29 also supports a smoke-stack 31, which is connected to the casing 16. Girders 25 form a support for a receptacle, 32, for the hot sand which is delivered from the sand drying apparatus, 14, to said receptacle, by means of a conveyer-belt, 33.

The central connecting structure is so constructed that it may be readily taken apart and dismounted, and packed away upon the platforms 2 and 3, for transportation.

In operation, the above described portable structure being in position as illustrated in Figs. 1, 3, and 4, the ingredients for the plastic paving material are prepared for mixture upon the principal platforms, 2 and 3, and are brought together by suitable mechanism, (not shown) driven from the power-plant, on platform 2, and are assembled in the mixing-tank 30, on the central connecting structure, and the mixture is then delivered directly therefrom into carts stationed in the drive-way between the two principal platforms.

I claim as my invention—

1. In a portable plant for mixing paving material, the combination of the pair of portable platforms carrying mechanism for preparing the ingredients which form the paving material, and an intermediate detachable structure connecting said platforms and carrying an apparatus for assembling said ingredients, said structure being connected to said platforms in such a manner as to support the assembling apparatus above the space between the platforms, and to permit a driveway between the platforms and below said assembling apparatus, substantially as and for the purpose set forth.

2. In a portable plant for mixing paving material, the combination of a pair of platforms each having at one end a pair of tubular columns erected thereon, and an intermediate structure connecting said platforms, the corner posts of said intermediate structure passing telescopically through said hollow columns, and resting upon the ground, whereby said platforms are held at a fixed distance apart, and said intermediate structure is supported independently of the platforms, as set forth.

3. In a portable plant for mixing paving materials, a portable platform, columns erected upon said platform, and supporting a roof structure, light auxiliary platforms hinged to the opposite edges of the main platform, and adapted to be folded vertically thereon, or extended horizontally therefrom so as to form extensions of the main platform, doors hinged to opposite edges of the roof structure so as to swing in a vertical plane thereon, and a series of independent posts arranged to support the free edges of said doors, and carrying collars which engage the free edges of the auxiliary platforms, whereby said doors and auxiliary platforms, when extended, are supported at their free edges independently of the main platform, all substantially as and for the purpose set forth.

FREDERICK A. HETHERINGTON.

Witnesses:
H. P. HOOD,
V. M. HOOD.